Oct. 20, 1964
H. K. DEARBORN
3,153,356
GUN DRILL
Filed Dec. 17, 1962
2 Sheets-Sheet 2
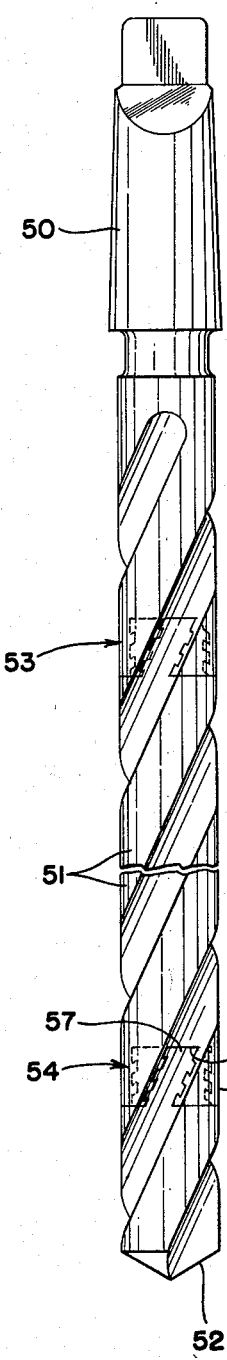
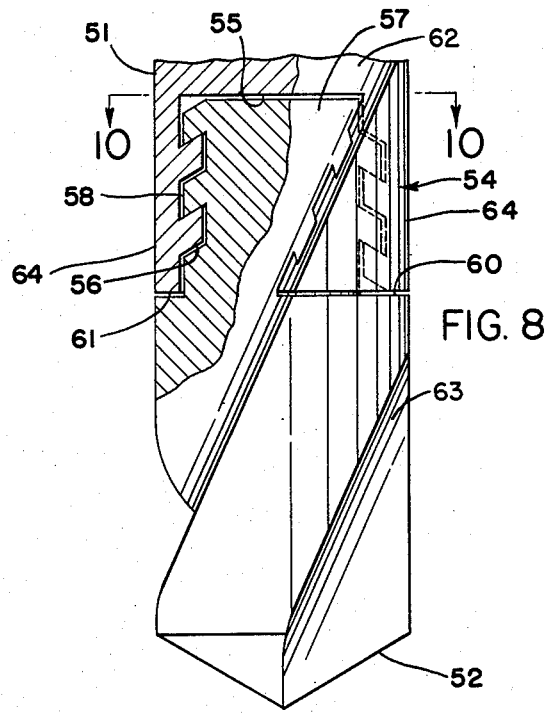
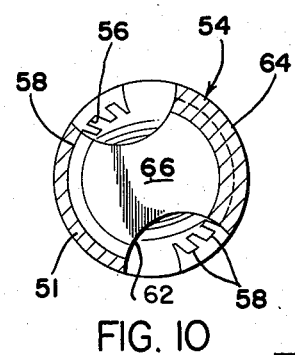
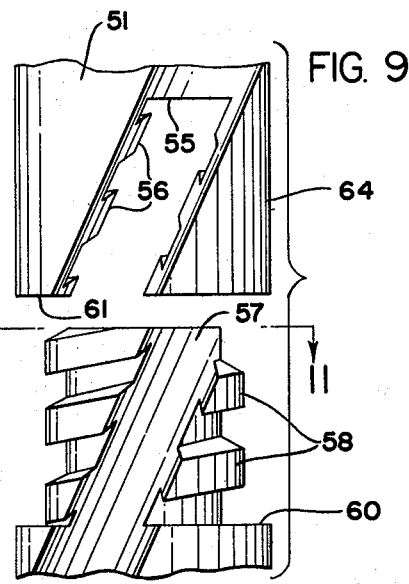
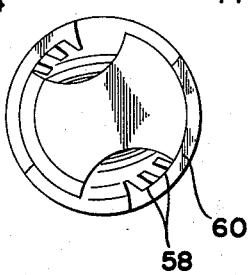
INVENTOR.
HOWARD K. DEARBORN
BY
*Fay & Fay*
ATTORNEYS

United States Patent Office 3,153,356
Patented Oct. 20, 1964

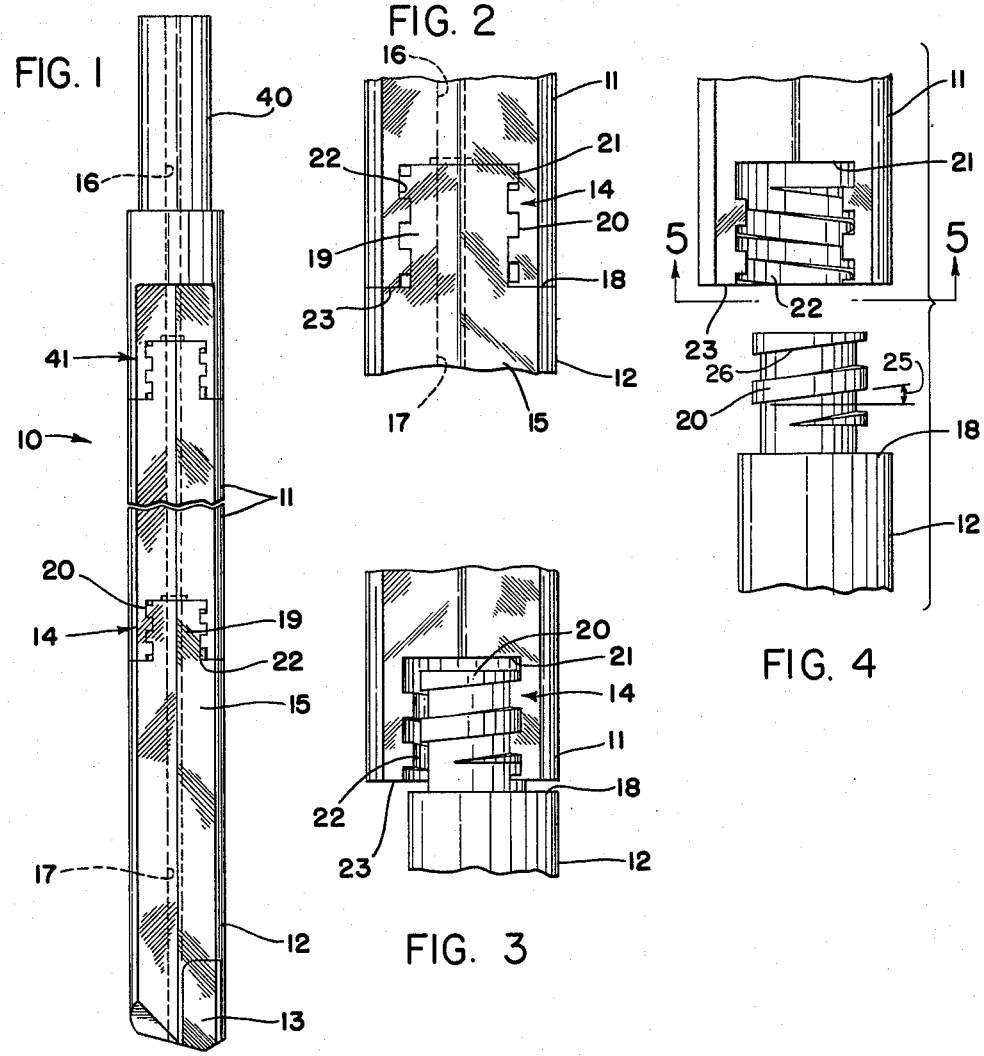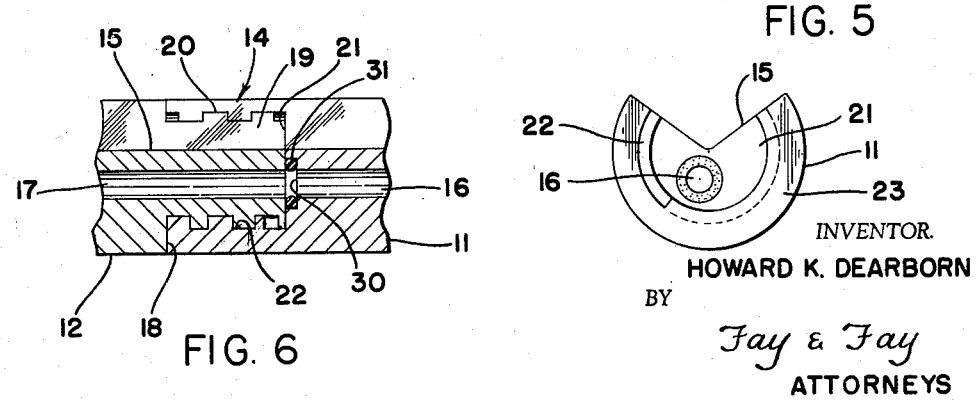

3,153,356
GUN DRILL
Howard K. Dearborn, 31 Manning Drive, Berea, Ohio
Filed Dec. 17, 1962, Ser. No. 245,088
12 Claims. (Cl. 77—68)

This invention generally relates to boring devices, and more particularly is directed to boring devices such as gun drills, twist drills, reamers and the like, where the peripheral portion of the drill is interrupted by a chip groove or the like.

The term "gun drill," although a misnomer, is derived from the practice of drilling long holes in gun barrels to extremely exacting tolerances. The term "gun drilling" has persisted, nothwithstanding the fact that precise drilling is no longer limited to the production of gun barrels, with the modern connotation including all precise boring operations which require a gun drill, etc.

Gun drills have been found satisfactory to perform precise boring jobs in a wide variety of metals; however, many problems exist which are common to those engaged in the business of precision boring.

One of these problems broadly entails the necessity of a great capital investment in gun drills in order to be prepared to fullfill the wide range of demands of manufacturers. Obviously, the demands of consumers require that holes of varying diameters be bored. In addition, depth requirements vary over a wide range from a fraction of an inch to over 40 feet. This requirement dictates that the machine shop be provided with a great number of drills of varying sizes and lengths in order to meet the demands imposed.

A simple and logical solution to the problem apparently would be an ample supply of long drills of varying diameters capable of boring long as well as short holes. Although this sounds reasonable, the problem is further compounded because the various gun drilling machines on the market in most cases require the adapter on the drill to be of a certain configuration to fit the holder or chuck portion of the machines. These requirements range from straight cylindrical adapters to tapered and threaded adapters. Consequently, it has been necessary to purchase drills with a particular adapter for a particular machine. Even if the adapter problem were solved with integral drills, the bed lenth of the gun drilling machine must be considerably greater than twice the length of the hole to be bored, plus extra length enough to retract the drill out of the drill guide bushing and the chip box, and to withdraw the drill adapter from the holder. If only long drills were stocked, it would necessarily require that all gun drilling machines in the shop have long beds capable of handling the long drills. Obviously, cost and space requirements stand in the way of this proposed solution.

Machine shops engaged in the precision boring business have resorted to stocking gun drills of varying sizes, lengths and adapter configurations to meet effectively the demands of maufacturers from an economically feasible standpoint. Some, however, have attempted without success to avoid expensive stocking of drills of varying lengths by modifying the length of the shank through detaching the expensive tip therefrom and attaching it to a shank of required length, the latter being inexpensive. The known methods involve considerable expense and are objectionable for reasons to become apparent.

The problems noted above in connection with gun drills are equally applicable to other drills such as twist drills, reamers, target drills and the like. One element common to all drilling devices is the necessity of having a hard cutting surface such as carbide, tool steel or the like. Up to the present, the twist drills have been made entirely of tool or high speed steel, which is expensive. The cost of the drill could be reduced if only the cutting or tip portion were of expensive steel and the shank and adapter were formed of cheaper materials.

The instant disclosure proposes a solution to the above problem in that it provides a novel means whereby a tip can be detachably secured to a variety of shanks in a manner to insure straight precision drilling. The novel means permits the tip to be readily attached to and detached from any number of shank sections of any length with no impairment of the expected precision in drilling. The shank portion can be attached to the particular adapter portion required by the individual machine. Notwithstanding this amazing versatility, the cutting tip, guiding portion, shank and adapter, when joined, are perfectly coaxial insuring precision drilling.

Detachable drill tips as such are broadly old in the art. However, with respect to gun drills suitable for precision boring, the known prior means and modes necessary to provide detachable tip portions have presented serious problems. One known mode of fastening a tip to the shank was to form a scarf joint and join, by welding, the tip portion to the shank. Obviously, this was objectionable from the standpoint of alignment and loss of temper. Further, the procedure was cumbersome, time-consuming, and costly, and the heat of the welding operation oftentimes seriously affected the temper of the drill.

Other prior art devices provided a longitudinal bore and counterbore in the tip portion with a tapped hole in the shank. various types of joints, such as mortise and tenon, and the like, were used to align the bore and tapped hole. Suitable cap screws were then inserted in the counterbored holes to be received threadably in the tapped portion of the shank. This has been found to be unsatisfactory.

In the main, machine shops utilizing gun drills have returned to stocking a variety of drills of varying shank lengths having various adapter portions in order to be equipped for drilling jobs of any length and diameter and capable of use with a variety of machines. This is obviously unsatisfactory since, when it is necessary to drill a hole longer or shorter than the drills available, it then becomes necessary either to buy an additional drill to meet this particular need or to modify a drill in stock by expensive cutting and welding technigues. Gun drills, because of the extensive close tolerance machining required to manufacture them, are exceedingly expensive and considerable capital is required to stock drills of all sizes and lengths.

One of the more important aspects of the instant invention is the provision of a detachable tip suitable for use with a variety of adapters and shanks of any length. It is consequently now possible to reduce the inventory of drills required to adapt a given shop to perform a complete range of gun drilling operations.

The novel joint means here employed facilitates exact alignment of the tip with the shank and adapter, while further allowing a full sized oil port through the joint. The tip is firmly joined to the shank to insure precision drilling at high speed and feed as will be later described. Additionally, the novel locking angle of the threaded joint allows the tip and shank portions to be disassembled with a minimum amount of torque effort required without special tools or any damaging marks or gouges to the drill.

Another important advantage is found in the ease with which the detachable tip may be sharpened. In the past, drills with integral shank and tip portions have required, in the case of extremely long and/or heavy drills, the efforts of two men to perform the sharpening operation. The proper sharpening of a drill, as is expected, requires precision grinding. In drills of exceedingly long lengths or large sizes, it is particularly difficult to obtain this precision during the sharpening operation.

In boring holes of considerable depth, it is necessary to sharpen the drill a number of times. The drill is held in chuck of the machine and passes through one or more guide bushings, through a chip box, a bushing and into the work. When the shank and tip are integral, it requires the complete drill to be removed from the machine at considerable disadvantage and loss of time. With the novel construction herein disclosed, it is only necessary to back the tip portion into the chip box where it may be quickly and easily removed, sharpened and installed with a minimum of effort and time and no apprehension of misalignment when the boring operation is continued. The detachability of the cutting tip has an additional advantage when contrasted with prior art types, in that the bed length of the machine can be lesser than with non-detachable drills. In order to effect removal of the latter type, from a machine, during the drilling operation, the bed of the machine using such type must have an additional axial length slightly greater than the axial length of the adapter, which is a feature limiting the use of particular machines.

With the problems of the prior art devices in mind, it is a general object of this invention to provide a new and improved joint for adapters, drill shanks, tips and the like.

It is a further object of this invention to provide a detachable tip for a gun drill wherein the tip may be removably mounted to the shank by less than a single revolution of the tip with respect to the shank.

It is a further object of this invention to provide a novel means to join a drill tip to a shank employing thread means having a precise locking angle thereon.

It is a still further object of this invention to provide a novel gun drill having a detachable tip portion which is sealed to the drill shank around the coolant port to insure continuous pressure of the coolant at the cutting tip.

It is a still further object of this invention to provide a detachable tip for a gun drill wherein the tip may be connected to the shank with a precision alignment of the chip feed groove in the shank and tip portion, as well as the cutting portion of the tip with the axis of the shank and adapter.

It is a further object of this invention to provide a detachable tip for a gun drill which will insure drill performance in accordance with the most exacting requirements as to tolerance and finishes.

It is a further object of this invention to provide shank sections to be added one to another to make up longer or shorter drills and maintain alignment, full size oil passage, and maximum shank strength.

It is a further object of this invention to provide a novel joint means so that drill shanks may be interchanged between different types and sizes of drill shank adapters.

Other and more specific objects of the invention will become apparent when reference is made to the detailed description to follow and the accompanying drawings, wherein:

FIG. 1 is a view of a gun drill in elevation looking into the V-shaped chip groove;

FIG. 2 is an enlarged view of the joint between the shank and tip portions looking into the chip groove;

FIG. 3 is a view showing the threads on the tip inserted into the female threads on the shank portion before twisting to lock the same in place;

FIG. 4 is a view of the shank and tip in their respective oriented positions prior to joining;

FIG. 5 is a view taken along the line 5—5 of FIG. 4;

FIG. 6 is a fragmentary sectional view of a gundrill incorporating the novel connection showing the tip and shank portions in assembled relationship;

FIG. 7 is an elevational view of a three pieced twist drill;

FIG. 8 is an enlarged portion of the drill tip and the shank shown fragmentarily with part of the joint in section;

FIG. 9 is an enlarged view of the drill joint with the parts disassembled;

FIG. 10 is a view taken along the line 10—10 of FIG. 8; and

FIG. 11 is a view taken along the line 11—11 of FIG. 9.

Referring now to FIG. 1, a gun drill is shown generally at 10, having a drill adapter portion 40, shank portion 11 and tip portion 12. The tip is provided with a carbide cutting tip 13 which is ground at the proper angle to facilitate good cutting action. Suitable carbide pads (not shown) for guiding the cutting 13 are provided on the back side of the drill. The joint connecting the tip portion 12 to the shank portion 11 is indicated generally at 14. The tip 12 is joined to the shank 11 in a manner so as to insure proper alignment of the tip 12 with the shank. Similarly the shank 11 is connected to the adapter 40 by a joint indicated generally at 41 like the joint 14. Additionally, the coolant port shown in dotted lines at 16 must also be aligned in each of the respective portions to insure the proper pressure and feed of coolant to the cutting tip. The novel joints used serves to keep the adapter 40, shank 11 and tip 12 portions perfectly coaxial.

As is well known in the gun drilling art, it is essential that an adequate supply of clean coolant to the point of the cutting tool be provided. In this regard, the coolant supply is recirculated, cooled and filtered before being returned under the proper pressure to the cutting tip. The fineness of the finish of the drilled hole can often be improved by the use of controlled coolant pressures. Therefore, the proper alignment of the fluid port 16 in the shank with the port 17 in the tip is important to the accomplishment of an unconstricted path for proper flow and pressure.

Since each of the joints 41 and 14 involve substantially the same solution to the problems hereinbefore enumerated, description will be directed to a single joint for sake of brevity. Referring now to FIG. 2, an enlarged view of the joint 14 connecting the tip to the shank is illustrated, as viewed looking into the chip groove. The tip portion 12 has a shoulder 18 which merges with a generally cylindrical portion 19 of reduced diameter. An axially extending V notch interrupts the periphery to form a chip groove 15. The chip groove 15 is normally formed by removing a pie-shaped portion of about 110° in angular extent from one side of the drill portions, as is best seen in FIG. 5.

The reduced cylindrical portion 19 is provided with male threads indicated at 20. The shank portion 11 is provided with a counterbored portion or socket means 21 which is provided with female threads, indicated generally at 22, of a pitch corresponding to those on the cylindrical portion 19. It has been found that the locking angle of the threads must be within the range of from about 3° to about 9° to insure the necessary coaxial alignment and to facilitate ease in removal and attachment of the respective drill portions. The term "locking angle" is used to refer to the angle at which the flank 26 of the threaded portion 20 is disposed with respect to a plane normal to the axis of the drill. In FIG. 4 of the drawing, the locking angle is indicated by reference numeral 25. The locking angle is the angle that is analogous to the helix angle as applied to screw threads. Should the locking angle be significantly in excess of 9°, it has been found that the tip portion becomes very easily disassembled from the shank portion. On the other hand, if the locking angle is significantly less than 3°, the tip portion will become so tightly secured to the shank portion when the drill is subjected to torque, that disassembly of the two portions is extremely difficult. However, if the angle referred to as the locking angle is between 3° and 9°, the tip portion will remain assembled with the shank portion, and the drill may be extracted after long periods of usage and after having been subjected to large torques, will be easily disassembled. It should be apparent that the design of the retaining means on the counterbored portion 21, of whatever configuration, must be the same as the design of the cooperating means on the cylindrical coaxial extension 19. Also, the angle at which the ridge means 20 is disposed with respect to a plane transverse to the axis of the tip must be substantially the same as the angle at which the groove means 22 is disposed with respect to a transverse plane normal to the axis of the shank portion. An optimum locking angle of 6° has been found to be most satisfactory. The counterbored portion or socket means 21 must extend around the cylindrical portion 19 more than 180° in order for the interfitting threads to hold the drill portions assembled. In the preferred embodiment the threads are in engagement through 250°, the remaining 110° forming the chip groove. Slight variances could be made in the angle of the chip groove within the limits of the strength of the metals.

Although a square thread is shown, it is obvious that a leaning thread could be substituted under circumstances which will be described hereinafter. In the main, the square thread, being somewhat easier to machine, has been shown as a preferred form of connecting means where the wall thickness is satisfactory. It is further obvious that the threads could be reversed, with the female threads on the shank and the male threads on the tip.

The shoulder 18 co-operates with an abutment 23 on the shank 11. The tolerances between these two surfaces are exceedingly important since they limit the turning of the tip threads into the threaded counterbore of the shank. The criticality of these two surfaces is further important to insure alignment of the fluid port 16 with the fluid port 17 in the tip portion while aligning the chip grooves in the respective portions. If the chip grooves of the respective portions are misaligned, the chips could catch on the shoulder and jam or clog the feed. If the feed should be impaired at this point, it would cause binding of the drill with consequent drill breakage. More important, the shoulder 18 and abutment 23 serve to align the cutting tip and grinding pads co-axially with the shank and adapter to insure true drilling.

Referring now to FIG. 4, a fragmentary tip portion is shown detached from a fragmentary portion of the shank. Disassembly is accomplished by merely rotating the tip about 110° with respect to the shank. The tip may then be lifted out laterally through the chip groove. Insertion is performed in a similar manner in that the parts are oriented with respect to each other, as shown in FIG. 4, and the tip and shank brought into overlying relationship at the chip groove and rotated slightly as shown in FIG. 3. The drill tip may then be rotated through the approximately 110° angle in either direction so as to engage or disengage. Because of the particular locking angle on the threads and the controlled surfaces abutting square shoulders 18 and 23, the ports and chip groove are in alignment, and the tip is held (firmly) in *perfect* coaxial alignment with the shank for proper and accurate gun-drilling.

Referring now to FIGS. 5 and 6, the chip groove is indicated at 15. A suitable counterbored portion 30 is provided in the counterbore 21, with the counterbore 30 being substantially coaxial with the port 16. Suitable sealing means, such as an O-ring 31, is received therein to insure that the coolant will not leak outwardly from the joint when the joint is exposed while oil pressure is on. This applies to shank extension pieces as well as the tip. It is obvious that any suitable sealing means may be employed which will perform the function, including carefully machined co-operating surfaces.

Referring now to FIG. 7, a three pieced twist drill is shown in elevation having an adapter section 50, shank section 51, tip portion 52. As is well known in the art, the adapter portion 50 may take a variety of forms other than the tapered form shown. The particular adapter configuration is necessarily determined by the machine with which the drill is used. In the embodiment shown, each of the individual portions is connected by a pair of joints indicated generally at 53 and 54. As is well known in the art, the cutting or tip portion 52 must be of hard steel such as high speed or tool steel in order to cut other metals. These types of steel are exceedingly expensive, and it is contemplated with the instant invention only the tip portion is required to be formed of such material while the shank and adapter portions may be of relatively inexpensive steel, since they serve only two basic functions, i.e., to remove the chips from the hole and to transmit torque and axial force to the cutting point. The novel joints indicated at 53 and 54 are identical; therefore, description will be given in connection with only one, which will be equally applicable to the other. It is to be understood that a series of joints may be required in the case of long twist drills.

Referring now to FIGS. 8–11, an enlarged form of the joint is illustrated to assist in clearly describing the same. The shank 51 is provided with a counterbored portion 55 with the internal wall being provided with thread means 56. The threads 56 are of the square thread variety leaning rearwardly. The tip portion 52 is provided with a reduced extension 57 which has mating threads 58 to co-operate with the leaning thread 56. The threads 56 and 58 are interrupted at the chip groove, as seen in FIGS. 10 and 11, since it is of lesser diameter than the root diameter of the threads. The locking angle on the threads is critical, as noted with respect to the previous embodiment, the locking angle being between 3° and 9° with an optimum of 6° desirable. The cylindrical portion 57 is formed by turning down the tip portion, leaving a shoulder 60, which co-operates with a shoulder 61 on the shank portion. Great care is exercised to control the respective dimensions on the abutting shoulders so that when the tip is threaded into the shank section alignment of the flutes 62 and 63 is had along with the tip being coaxial with the shank. Normally when severe torque is imposed upon the drill the wall portion 64 would have a tendency to expand. However, when the threads are of the leaning or undercut variety, such torques serve to draw the wall portion 64 tighter to the threaded extension 57 thereby preventing expansion. This unique action is the result of a co-operatnig action between the shoulders 61 and the undercut or leaning threads 56 and 58. When the wall thickness is such that it is capable of withstanding expansion, a square thread such as that shown in connection with FIGS. 1–6 may be used. The joint above described has been particularly successful in use with drills with a reduced web thickness, such as that indicated in FIG. 10 at 66.

It is possible with the use of the novel joint herein disclosed to assemble and disassemble the respective parts without the use of pins, bolts, keys and the like, which make the operation difficult, and in most instances impossible. One of the more important features of the novel joint, is that when manufactured in accordance with the instant invention, it insures that the adapter, shank, and tip portion will be coaxial to insure straight drilling. Moreover, it further insures that the chip grooves will be aligned so that feeding of the chips from the bore will not be impaired.

A further feature worthy of note, is that the diameter of the male connecting member 57 is in excess of the web, thereby insuring that the torque transmission from the shank to the tip will not be reduced. The completed joint is strong enough to transmit the normal torques expected to be encountered in the use of the twist drill.

The novel joint has a further advantage when considering drills, twist drills, of substantial length and diameter. Drills of this variety are exceedingly heavy and oftentimes require two or three men to perform the sharpening operation. When the instant invention is employed, it allows the tip portion to be easily detached, and the proper cutting angle ground on the tip portion by a single man with greater accuracy and ease as opposed to former methods. Moreover, when the tip portion becomes worn or ground down where it is no longer useful, only the tip need be replaced, since the remainder of the drill will adequately perform the drilling operation without replacement. This serves to reduce the initial cost and replacement of drills, while allowing a single drill to be used with a wide variety of adapters, and drilling long or short holes, by merely inserting or removing sections.

One further advantage is the ease with which an oil port may be drilled through each of the respective sections with a Y branch in the flutes of the cutting tip. Since the novel joint controls the angular relationship between sections, uniformity in positioning of the port will allow interchanging sections without detrimental effects. When the tip has been ground and reground back to the intersection of the Y, only the tip need be replaced whereas in the prior art devices the entire drill needed replacement. It is understood that seal means such as that shown in FIG. 6 may be provided under such circumstances. This builds in a greater versatility for the drill in conjunction with the wide variety of machines that might be used, without resorting to great capital expenditures to purchase drills of a wide variety of lengths for each individual machine. Although the embodiment above has been described in connection with twist drills and gun drills, the joint may be equally applicable to any drill or shaft having an irregular periphery.

For ease of description the principles of the invention have been set forth in connection with but a single illustrated embodiment. It is not my intention that the illustrated embodiment, nor the terminology employed in describing it, be limiting inasmuch as variations in these may be made without departing from the spirit of the invention. Rather, I desire to be restricted only by the scope of the appended claims.

I claim:

1. A tool comprising a shank portion and a tip portion, a socket in the shank portion, at least one flute in the shank portion, said flute intersecting the socket to thereby provide a lateral opening therein, said tip portion having an extension thereon of a reduced diameter with respect to the remainder of the tip portion adapted to be received in said socket, means on said extension protruding radially therefrom and disposed at an angle of from 3° to 9° with respect to a transverse plane normal to the axis thereof, recessed means in said socket adapted to receive said means on said extension, said recessed means being disposed at an angle with respect to a transverse plane normal to the axis of the shank portion which is substantially equal to the first mentioned angle.

2. The drill of claim 1 wherein a coolant port is provided in each of the shank and tip portions, said port being aligned when said coaxial extension on said tip portion is received within the socket in the shank portion.

3. The drill of claim 2 wherein seal means is provided at the intersection of the shank coolant port with the port in the tip portion.

4. A multi-piece drill having a tip portion detachably secured to a shank portion, said shank being detachably secured to an adapter portion, a chip groove on each of said portions, the chip groove on each of said portions being in alignment with the chip groove on the adjacent portion, said shank having a counterbored portion at one end thereof, first thread means in said counterbore, said tip portion having a reduced diameter extension thereon, second thread means on said extension to co-operate with said first thread means in said counterbore, said second thread means being disposed at an angle of from 3° to 9° with respect to a transverse plane normal to the axis of said extension, said first thread means being disposed at an angle with respect to the axis of the counterbore which is substantially the same as the angle at which said second thread means is disposed with respect to the extension, shoulder means on said extension co-operating with abutment means on said shank to limit the rotation of said tip portion with respect to said shank portion, said adapter portion having a counterbored portion therein, third thread means in said counterbore, said shank having a reduced diameter extension at the other end having fourth thread means thereon to co-operate with said third thread means in said counterbore, said fourth thread means being disposed at an angle of from 3° to 9° with respect to a transverse plane normal to the axis of said extension, said third thread means being disposed at an angle with respect to a transverse plane normal to the axis of the counterbore which is substantially the same as the angle at which the fourth thread means is disposed with respect to the transverse plane normal to the axis of the said extension, whereby each of said portions will be in perfect coaxial alignment as well as said chip groove in each of said portions.

5. The drill of claim 4 wherein said first, second, third and fourth thread means comprises leaning threads which are angled in a direction away from said tip portion.

6. The drill of claim 4, further characterized in that the chip groove is selected with an included angle and positioned so that it intersects the counterbore in the shank portion and the counterbore in the adaptor portion to provide a lateral opening therein of a sufficient width to laterally receive the extension on the tip portion and the extension on the shank portion respectively.

7. The drill of claim 4 wherein a coolant port is provided in each of said shank and tip portions, said shoulder and abutment serving accurately to align said ports when said tip and shank are in assembled relationship.

8. The drill of claim 7 wherein seal means is interposed between each of said extensions and each of said counterbores, said seal means extending circumferentially around said ports to prevent leakage between said shank and tip portions.

9. A gun drill comprised of a plurality of sections, each of said sections having a groove therein, said groove extending longitudinally of said sections, counterbore means in one of said sections, said counterbore having internal threads therein, said threads having a locking angle of between 3° and 9°, a reduced extension on the other section, said extension having external threads thereon to co-operate with said threads in said counterbore, each of said threads being discontinuous, and shoulder means on said one section to limit the rotation of one section with respect to the other so as to align said groove and each of said sections coaxially.

10. A tool comprising a shank portion and a detachable tip portion, said tip portion having an extension thereon of a reduced diameter with respect to the remainder of the tip portion, a socket in said shank portion, thread means on said extension, said thread means being disposed at an angle of about 3° to 9° with respect to a transverse plane normal to the axis of said tip portion, thread means in said socket portion, said thread means in said socket portion being disposed at an angle with respect to a transverse plane normal to the axis of the shank portion which is substantially the same as the first mentioned angle, said thread means on said shank in said socket being similarly configured to the threads on the extension.

11. A tool comprising a tip portion and a shank portion, a generally cylindrical socket means on one of said portions and generally coaxial with said one portion, a reduced diameter coaxial extension on the other of said portions, protruding means on said extension which protrude radially therefrom, said protruding means being disposed at an angle between 3° and 9° with respect to a transverse plane normal to the axis of said extension, recessed means in said socket similarly configured to said protruding means, said recessed means being disposed at an angle with respect to the axis of said socket which is substantially equal to the angle at which said protruding means is disposed with respect to a transverse plane normal to the axis of said extension.

12. A tool comprising a tip portion, a shank portion, and an adaptor portion, connecting means detachably interconnecting said tip portion to said shank portion, and connecting said shank portion to said adaptor portion, said connecting means comprising a socket means in one of the portions and generally coaxial therewith, a reduced diameter generally coaxial extension on the portion adjacent said one portion, protruding means on said extension which protrude radially therefrom, said portruding means being disposed at an angle of from 3° to 9° with respect to a transverse plane normal to the axis of said extension, recessed means in said socket adapted to receive said protruding means, said recessed means being disposed at an angle with respect to a transverse plane normal to the axis of said socket which is substantially equal to the angle at which said protruding means is disposed with respect to a transverse plane normal to the axis of said extension, said recessed means and said protruding means being similarly configured.

References Cited by the Examiner

UNITED STATES PATENTS

| | | | |
|---|---|---|---|
| Re. 24,924 | 1/61 | Willingham | 77–68 |
| 756,339 | 4/04 | Down | 77–70 |
| 1,116,794 | 11/14 | Butler | 175–417 XR |
| 1,645,032 | 10/27 | Wilson | 287–103 |
| 2,207,005 | 7/40 | Hass | 287–125 |
| 2,325,973 | 8/43 | Nurnberger et al. | 77–70 |

WILLIAM W. DYER, JR., *Primary Examiner.*

JOHN C. CHRISTIE, *Examiner.*